US011221988B2

(12) United States Patent
Kaneko et al.

(10) Patent No.: US 11,221,988 B2
(45) Date of Patent: Jan. 11, 2022

(54) FILE MANAGEMENT DEVICE AND FILE MANAGEMENT METHOD FOR PRESUMING NAMING RULE OF FILE NAMES

(71) Applicant: PFU LIMITED, Ishikawa (JP)

(72) Inventors: Marika Kaneko, Ishikawa (JP); Tomohiro Yamazaki, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 190 days.

(21) Appl. No.: 15/944,290

(22) Filed: Apr. 3, 2018

(65) Prior Publication Data

US 2019/0197124 A1 Jun. 27, 2019

(30) Foreign Application Priority Data

Dec. 22, 2017 (JP) .............................. JP2017-246008

(51) Int. Cl.
*G06F 16/16* (2019.01)
*G06F 40/205* (2020.01)
*G06F 3/0484* (2013.01)

(52) U.S. Cl.
CPC .......... *G06F 16/164* (2019.01); *G06F 40/205* (2020.01); *G06F 3/04842* (2013.01)

(58) Field of Classification Search
CPC .................................................. G06F 16/164
See application file for complete search history.

(56) References Cited

U.S. PATENT DOCUMENTS

| 7,039,873 | B2 * | 5/2006 | Morris ..................... G06F 16/10 715/748 |
| 9,449,080 | B1 * | 9/2016 | Zhang ..................... G06F 40/20 |
| 9,639,632 | B2 * | 5/2017 | Kim ........................ G11B 27/28 |
| 2003/0200229 | A1 * | 10/2003 | Cazier ..................... G06F 16/10 |
| 2004/0019613 | A1 * | 1/2004 | Jones ...................... G06F 16/93 |
| 2006/0050302 | A1 | 3/2006 | Sawaguchi |
| 2007/0192446 | A1 * | 8/2007 | Ivory ................... G11B 27/329 709/220 |

(Continued)

FOREIGN PATENT DOCUMENTS

| JP | 2006-072892 A | 3/2006 |
| JP | 2010-003309 A | 1/2010 |
| JP | 2018-124656 A | 8/2018 |

OTHER PUBLICATIONS

Japanese Notice of Reasons for Refusal issued in corresponding Japanese Patent Application No. 2017-246008, dated Mar. 2, 2021, with English translation, 8 pp.

*Primary Examiner* — Marc S Somers
(74) *Attorney, Agent, or Firm* — McDermott Will & Emery LLP

(57) ABSTRACT

The present invention provides a file management device that makes it possible to assign a file name according to a user's preference. There is provided a file management device includes: a memory; and a processor coupled to the memory and the processor configured to: presume a naming rule of the file names based on file names of data files present in a folder; register the naming rule, presumed by the rule presuming section, in a rule storages section in association with the folder; and assign a file name to a data file according to a naming rule associated with a folder in which the data file is present among the naming rules stored in the rule storage section.

6 Claims, 11 Drawing Sheets

OVERALL OPERATION (S10)

(56) References Cited

U.S. PATENT DOCUMENTS

2012/0143931 A1* 6/2012 Rosenberger .......... G06F 16/14
707/828
2018/0218208 A1   8/2018  Arakawa
2020/0320290 A1  10/2020  Arakawa

* cited by examiner

FILE MANAGEMENT SYSTEM 2

FIG. 4

| FOLDER | FILE NAME | TAG INFORMATION ||||| ATTRIBUTE INFORMATION || NAMING RULE |
| --- | --- | --- | --- | --- | --- | --- | --- | --- |
| | | TITLE | DATE | BUSINESS TRIP DESTINATION | NAME | SIZE | COLOR | |
| RELATING TO BUSINESS TRIP | STATEMENT NOTE FOR TRAVEL EXPENSE_20170824_YAMADA | STATEMENT NOTE FOR TRAVEL EXPENSE | 2017/08/24 | PFU | YAMADA | B5 | WHITE AND BLACK | \<TITLE\>_\<DATE\>_\<NAME\> |
| RELATING TO BUSINESS TRIP | STATEMENT NOTE FOR TRAVEL EXPENSE_20170825_SATOH | STATEMENT NOTE FOR TRAVEL EXPENSE | 2017/08/25 | FUJITSU | SATOH | B5 | WHITE AND BLACK | \<TITLE\>_\<DATE\>_\<NAME\> |
| RELATING TO BUSINESS TRIP | BUSINESS TRIP REPORT_PFU_YAMADA | BUSINESS TRIP REPORT | 2017/08/24 | PFU | YAMADA | A4 | COLOR | \<TITLE\>_\<BUSINESS TRIP DESTINATION\>_\<NAME\> |
| RELATING TO BUSINESS TRIP | BUSINESS TRIP REPORT_FUJITSU_SATOH | BUSINESS TRIP REPORT | 2017/08/25 | FUJITSU | SATOH | A4 | COLOR | \<TITLE\>_\<BUSINESS TRIP DESTINATION\>_\<NAME\> |

FILE NAME PRESUMPTION PROCESS (S30)

RULE PRESUMPTION PROCESS (S40)

(A) PROVISION OF FILE NAME IN CASE OF SINGLE RULE

FILE MANAGEMENT DEVICE AND FILE MANAGEMENT METHOD FOR PRESUMING NAMING RULE OF FILE NAMES

CROSS-REFERENCE TO RELATED APPLICATIONS

This application is based on and claims priority under 35 USC 119 from Japanese Patent Application No. 2017-246008 filed Dec. 22, 2017.

FIELD

The present invention relates to a file management device, a file management method, and a computer readable medium.

BACKGROUND

For example, Japanese Patent Application Laid-Open (JP-A) No. 2010-003309 discloses a file management system in which, based on tag information about a managed file 12, a predetermined file name is assigned to the managed file 12, then, based on the tag information, a hierarchical type folder is created as a storage place for the managed file 12, and the managed file 12 is saved as a subordinate of the last folder of the hierarchical type folder.

In addition, Japanese Patent Application Laid-Open (JP-A) No. 2006-072892 discloses an image processing system in which image data electronically filed by reading a document is temporarily saved in a RAM 4, then, file name candidates created in combination with key data saved in a second storage section 5 in advance are displayed on a touch panel 6a, and in response to user selection of a file name suitable for the electronic file, read from the file name candidates displayed on the touch panel 6a, the selected file name and the image data temporarily saved in the RAM 4 are made to correspond to each other and saved in a first storage section 8 as an image data file.

SUMMARY OF THE INVENTION

According to an aspect of the invention, there is provided a file management device comprising: a memory and a processor coupled to the memory and the processor configured to: presume a naming rule of the file names, based on file names of data files present in a folder; and output the naming rule in association with the folder.

According to another aspect of the invention, there is provided a file management device comprising: a memory and a processor coupled to the memory and the processor configured to: store a naming rule of file names of data files in association with a folder; and assign a file name to a data file according to a naming rule associated with a folder in which the data file is present among the naming rules stored.

According to another aspect of the invention, there is provided a file management method comprising: presuming a naming rule of file names based on file names of data files present in a folder; and outputting the naming rule in association with the folder.

According to another aspect of the invention, there is provided a file management method comprising: registering a naming rule of file names of data files with a database in association with a folder; and assigning a file name to a data file according to a naming rule associated with a folder in which the data file is present among the naming rules registered with the database.

According to another aspect of the invention, there is provided a non-transitory computer-readable recording medium storing thereon a computer program that causes a computer to perform a method comprising: presuming a naming rule of file names based on file names of data files present in a folder; and outputting the naming rule in association with the folder.

According to another aspect of the invention, there is provided a non-transitory computer-readable recording medium storing thereon a computer program that causes a computer to perform a method comprising: registering a naming rule of file names of data files with a database in association with a folder; and assigning a file name to a data file according to a naming rule associated with a folder in which the data file is present among the naming rules registered with the database.

The term "folder" in the present application means a group of data files, in which folders, directories, or the like are grouped.

BRIEF DESCRIPTION OF THE DRAWINGS

Exemplary embodiments of the present invention will be described in detail based on the following figures.

FIG. 4 is a view exemplifying information stored in an analysis result storage section 250 or a naming rule storage section 260.

FIG. 9A is a view exemplifying a process for providing a file name in case of single rule; FIG. 9B is a view exemplifying a process for providing a file name in case of plurality of rules.

DESCRIPTION OF EMBODIMENTS

Figure 1:
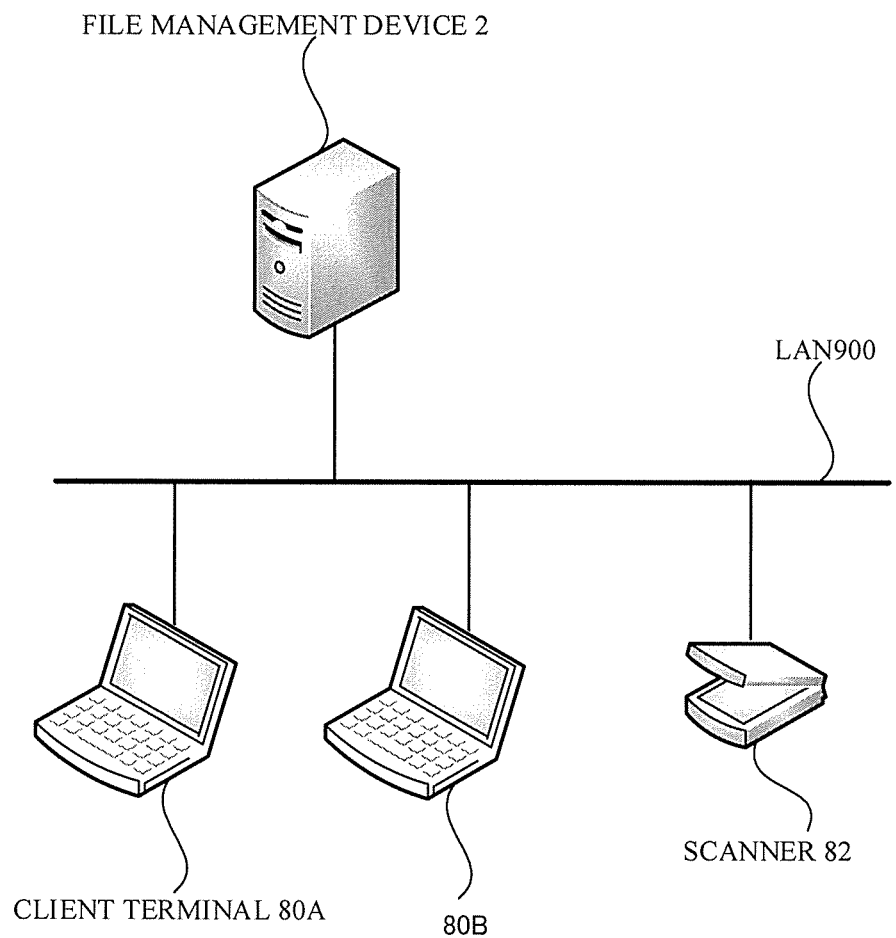
FIG. 1 is a view exemplifying an overall configuration for a file management system 1.

FIG. 1 is a view exemplifying an overall configuration for a file management system 1.

As exemplified in FIG. 1, the file management system 1 includes a file management device 2, a client terminal 80, and a scanner 82. In the present embodiment, the file management device 2 is connected to, but is not limited to, the client terminal 80 and the scanner 82 via a LAN 900, which is a network line.

The file management device 2 is an example of a file management device according to the present invention and is a computer terminal having a server function. The file management device 2 in the present embodiment has a function as file server, saves a data file received from the client terminal 80 or the scanner 82 into a predetermined folder, and assigns a file name to the data file saved therein.

The client terminal 80 is a computer terminal used by a user and, for example, according to a user's operation, registers a data file, such as an electronic document or image data, into a specified folder of the file management device 2.

The scanner 82 is a network scanner used by a user and, for example, according to a user's operation, reads an image from a document and automatically registers a data file of the read image data into a specified folder of the file management device 2.

Figure 2:
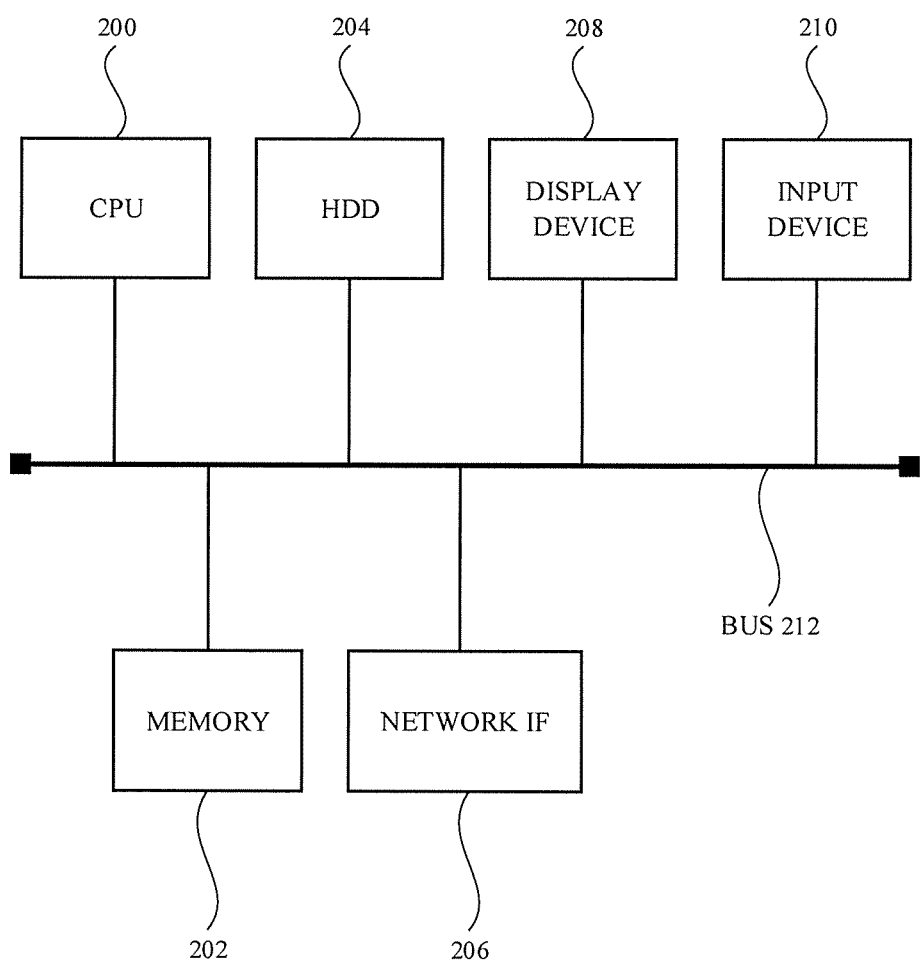
FIG. 2 is a view exemplifying a hardware configuration for a file management device 2.

FIG. 2 is a view exemplifying a hardware configuration for a file management device 2.

As exemplified in FIG. 2, the file management device 2 has a CPU 200, a memory 202, an HDD 204, a network interface 206 (network IF 206), a display device 208, and an input device 210, and these are mutually configured via a bus 212.

The CPU 200 is, for example, a Central Processing device.

The memory 202 is, for example, a volatile memory and functions as a main storage device.

The HDD 204 is, for example, a hard disk drive device and saves a computer program (for example, a file name management program 22 in FIG. 3) as a nonvolatile recording device, and other data files.

The network IF 206 is an interface for communicating by cable or wirelessly.

The display device 208 is, for example, a liquid crystal display.

The input device 210 is, for example, a keyboard and a mouse.

Figure 3:
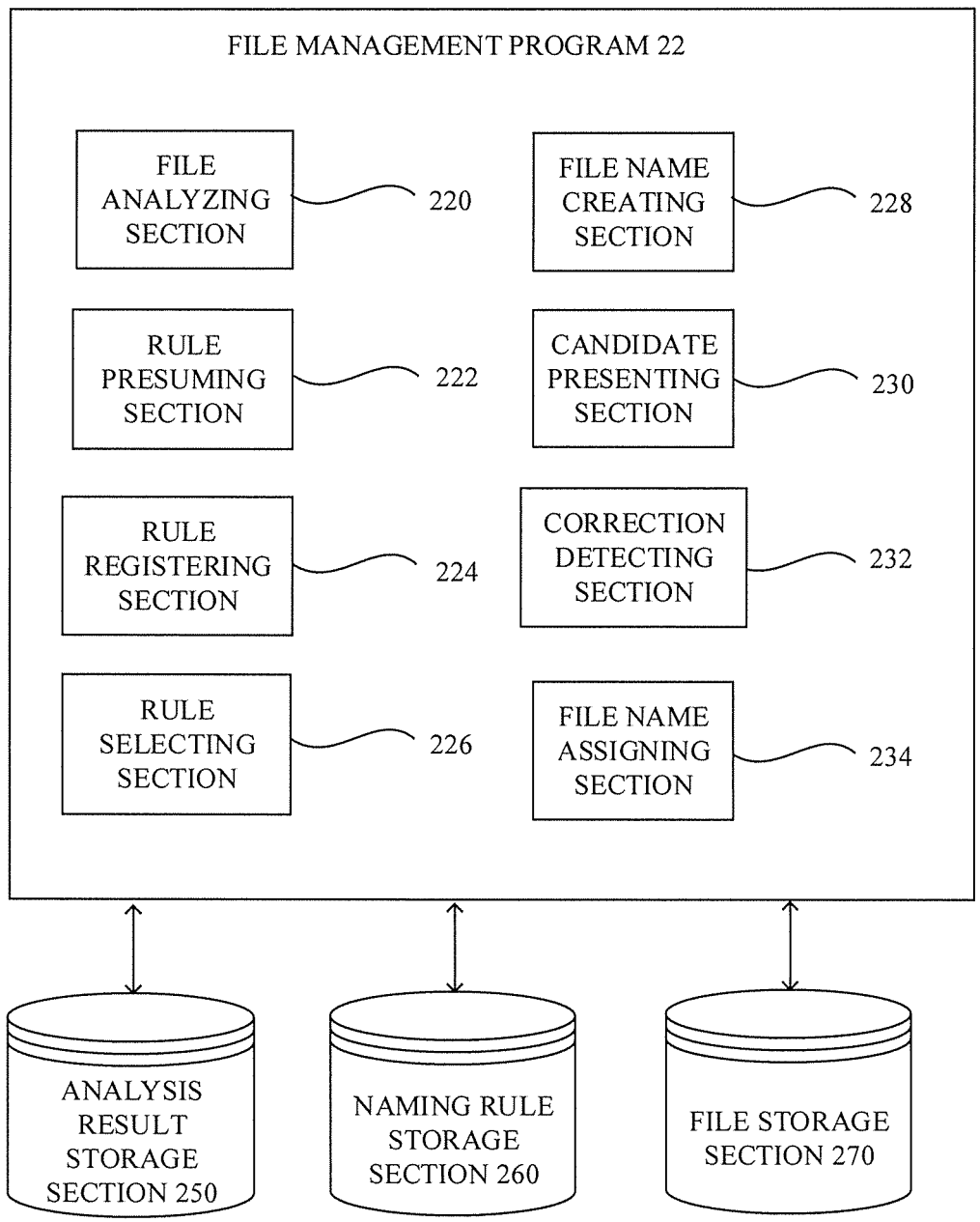
FIG. 3 is a view exemplifying a functional configuration for the file management device 2.

FIG. 3 is a view exemplifying a functional configuration for the file management device 2.

As exemplified in FIG. 3, while the file name management program 22 is installed in the file management device 2 of the present embodiment, an analysis result storage section 250, a naming rule storage section 260 and a file storage section 270 are configured. The file name management program 22 is saved on, for example, a recording medium, such as a CD-ROM, and is installed in the file management device 2 via this recording medium. In addition, the naming rule storage section 260 is an example of a database according to the present invention.

The file name management program 22 has a file analyzing section 220, a rule presuming section 222, a rule registering section 224, a rule selecting section 226, a file name creating section 228, a candidate presenting section 230, a correction detecting section 232, and a file name assigning section 234.

All or part of the file name management program 22 may be realized by hardware such as ASIC or may be realized by borrowing part of the function of OS (Operating System).

In the file name management program 22, the file analyzing section 220 analyzes a data file, and tags the content of the data file or generates attribute information about the data file. The file analyzing section 220 in the present embodiment tags a character string contained in a data file, then extracts attribute information about the data file, and registers the extracted tag and attribute information into the analysis result storage section 250 as exemplified in FIG. 4. Attribute information about a data file includes, for example, file type of the data file (text file, JPEG file, etc.), document size, number of colors (black and white/color), date and time of creation of the data file and date and time of updating of the data file, language and text code used in the data file, or data size or the like.

The rule presuming section 222 presumes a naming rule of the file names, based on file names of data files present in a folder. For example, based on the file name of a data file present in the folder and tag information or attribute information extracted from the data file, the rule presuming section 222 presumes a naming rule that should be applied to this folder. Here, a naming rule is a rule for determining a file name and is information specifying at least one of the followings: kind of a character string that should be used, combination of character strings, method for dividing a character string, and arrangement order of a character string.

The rule registering section 224 is an example of an output section according to the present invention, and outputs a naming rule, presumed by the rule presuming section 222, in association with a folder. For example, the rule registering section 224 registers a naming rule, presumed by the rule presuming section 222, into the naming rule storage section 260 in association with a folder. For example, the rule registering section 224 in this example registers a naming rule, presumed by the rule presuming section 222, into the naming rule storage section 260 in association with a folder or the like, as shown in FIG. 4.

In addition, in a case where a data file moves to a predetermined folder, the rule registering section 224 in this example registers at least part of a naming rule, associated with a source folder, into the naming rule storage section 260 in association with a destination folder. More specifically, in a case where a data file moves to a predetermined folder, the rule registering section 224 registers a naming rule, applied to this data file among naming rules associated with a source folder, into the naming rule storage section 260 in association with a destination folder, and instructs the other configurations to re-assign a file name to the data file present in the destination folder.

The rule selecting section 226 selects, from among naming rules registered by the naming rule storage section 260, a naming rule used for the creation of a file name, based on a folder in which the data file is registered. For example, the rule selecting section 226 selects, from among naming rules registered by the naming rule storage section 260, a naming rule to be used for the creation of a file name, based on a folder in which the data file is registered and based on tag information extracted from the data file or attribute information about the data file. In a case where a plurality of naming rules associated with a folder are present, the rule selecting section 226 may select the plurality of naming rules or may prioritize these naming rules and make a selection.

The file name creating section 228 creates a file name for a data file according to a naming rule selected by the rule selecting section 226. For example, the file name creating section 228 creates a file name for this data file, based on a naming rule selected by the rule selecting section 226 and based on tag information extracted from the data file. In a case where a plurality of naming rules are selected by the rule selecting section 226, the file name creating section 228 may create a plurality of file names as file name candidates according to each of the plurality of naming rules selected or prioritize these file name candidates.

The candidate presenting section 230 presents a user with a file name created by the file name creating section 228, as a file name candidate. In a case where the file name creating section 228 creates a plurality of file names, the candidate presenting section 230 may display, as file name candidates, the plurality of created file names in a list or arrange these file name candidates according to the priority order.

In a case where the correction detecting section 232 detects a correction to a file name made by a user, this section instructs the rule presuming section 222 to presume, based on the corrected file name, the naming rule of a folder in which this file is present. In a case where the correction detecting section 232 in this example detects a correction to a file name made by a user, this section instructs the rule presuming section 222 to presume, based on the corrected file name, the naming rule of a folder in which this file is present, and also instructs other configurations to re-assign the file name.

According to a naming rule associated with a folder in which a data file is present among naming rules saved in the naming rule storage section 260, the file name assigning section 234 assigns a file name to this data file. The file name assigning section 234 in this example assigns a file name to a data file, the file name being selected by a user among file names created by the file name creating section 228.

In a case where a data file moves to predetermined folder, the file name assigning section 234 updates the file name of this data file according to the naming rule of the destination folder.

Figure 5:
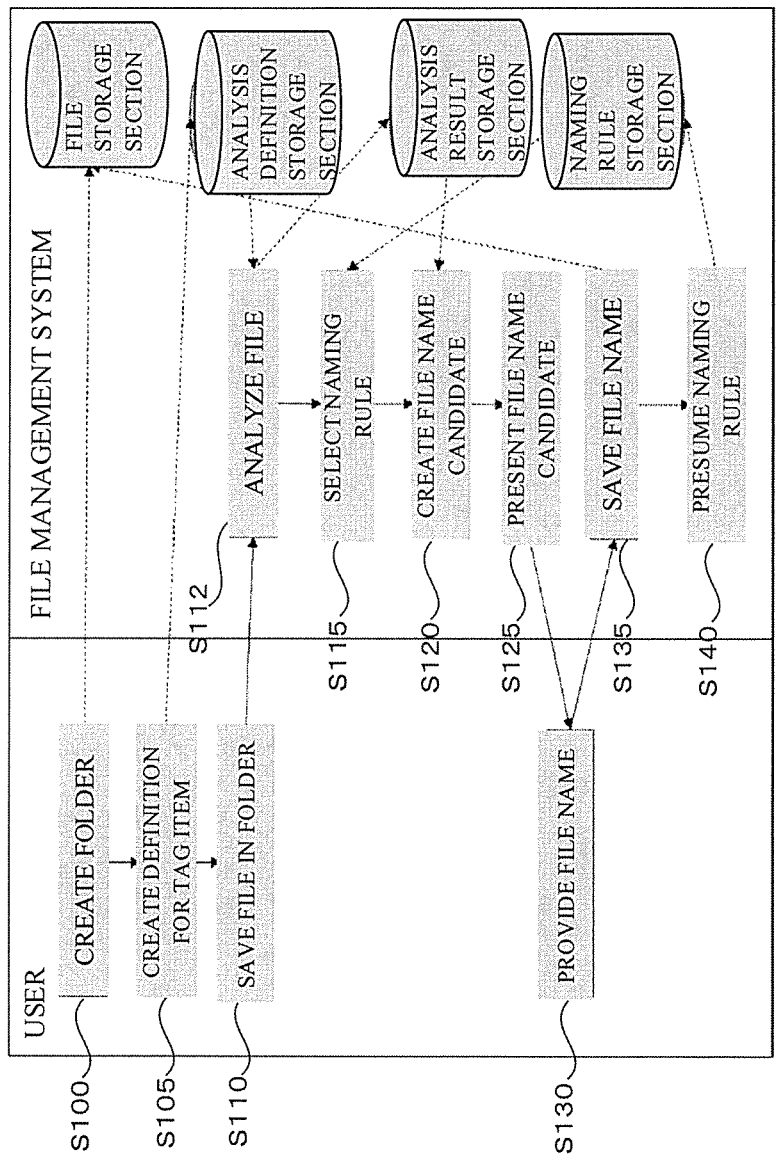
FIG. 5 is a flowchart illustrating the overall operation (S10) of the file management system 1.

FIG. 5 is a flowchart illustrating the overall operation (S10) of the file management system 1.

As exemplified in FIG. 5, in step 100 (S100), a user operates a client terminal 80 (FIG. 1) or the scanner 82, and creates a folder in the file storage section 270 of the file management device 2. A folder is created hierarchically according to the user's operation. A user's preference in arrangement is often reflected in hierarchical relation of folders.

In step 105 (S105), a user creates a definition for a tag item that is extracted from content of a data file, and the file analyzing section 220 creates a definition file for a tag item according to an input made by the user.

In step 110 (S110), the user operates the client terminal 80 or the scanner 82 to store a data file in the folder created in the file storage section 270.

In step 112 (S112), when the user saves the data file into the folder, the file analyzing section 220 extracts, according to the definition file of the tag item, tag information from the data file saved in the folder and registers the tag information into the analysis result storage section 250.

In step 115 (S115), the rule selecting section 226 selects a naming rule associated with this folder.

In step 120 (S120), according to the naming rule selected by the rule selecting section 226, the file name creating section 228 arranges a character string for the tag information extracted by the file analyzing section 220 and creates a file name candidate.

In step 125 (S125), the candidate presenting section 230 displays on the client terminal 80 or the scanner 82 the file name candidate created by the file name creating section 228. The file name candidate is presented in a state correctable by the user's input operation.

In step 130 (S130), the user selects a desired file name from among file names presented as file name candidates. In addition, the user may correct the file name through, for example, key input.

In step 135 (S135), the file name assigning section 234 determines, as a file name for the data file, the file name candidate presented by the candidate presenting section 230 or the file name corrected by the user, and registers it into the file storage section 270.

In step 140 (S140), based on the file name selected by the user or the file name corrected by the user, the rule presuming section 222 re-presumes a naming rule and registers it into the naming rule storage section 260.

Next, each process for realizing the overall operation (S10) described above will be described.

Figure 6:
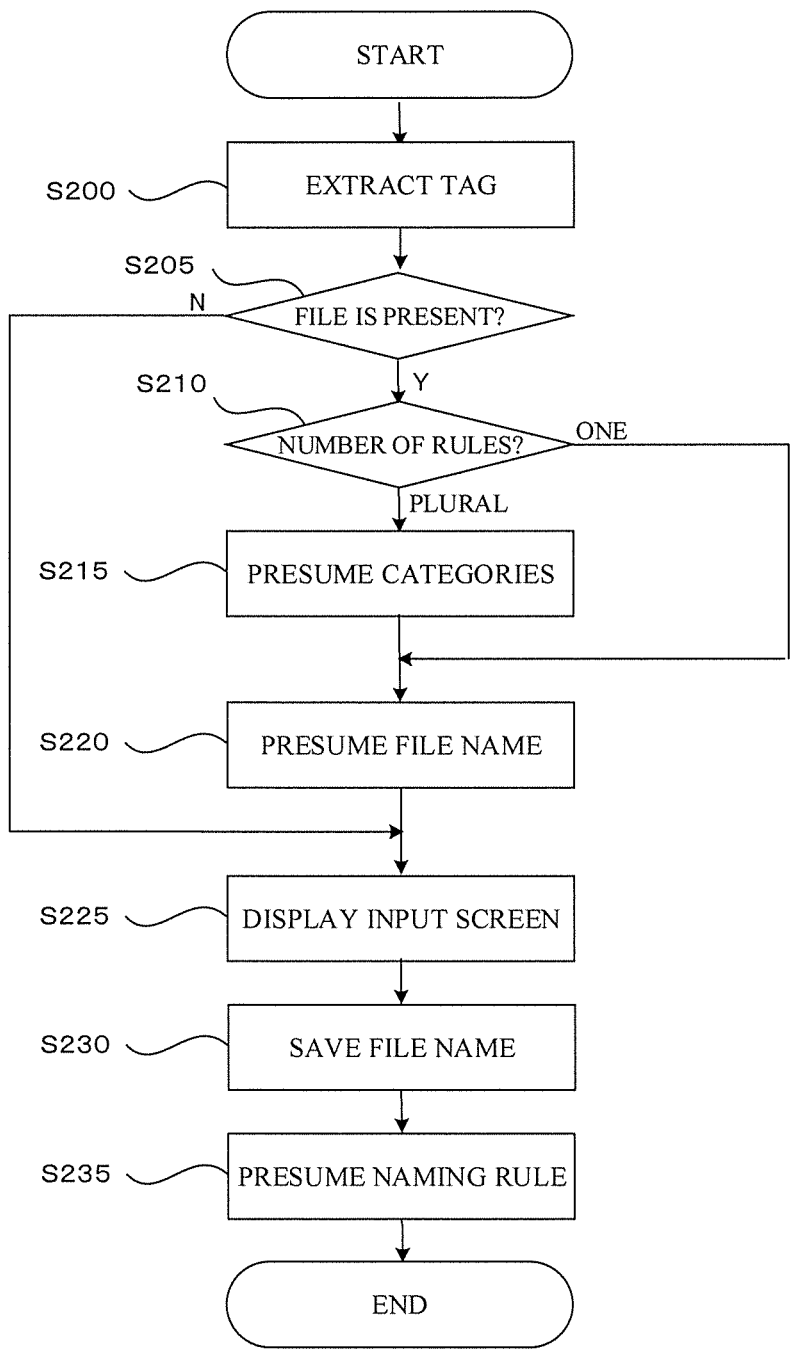
FIG. 6 is a flowchart illustrating overall processing (S20) for assigning a file name to a data file.

FIG. 6 is a flowchart illustrating overall processing (S20) for assigning a file name to a data file.

As exemplified in FIG. 6, in step 200 (S200), when a user saves a data file in a predetermined folder, the file analyzing section 220 extracts a tag from this data file according to the definition file of a tag item. A tag may be extracted using a model in which a series of texts have been learned, or when a data file is a standard report, the tag may be extracted from a fixed position or may be extracted using a model in which positions have been learned.

In step 205 (S205), the file name management program 22 determines whether an existing data file is present in a folder in which the data file may be saved. In a case where an existing data file is present, flow proceeds to a process in S210 and, in a case where an existing data file is not present, the flow proceeds to a process in S225.

In step 210 (S210), the rule selecting section 226 checks the number of naming rules associated with the folder where the data file may be saved. In a case where the number of naming rules is one, the rule selecting section 226 selects this naming rule and proceeds to a process in S220. In a case where the number of naming rules is plural, the rule selecting section 226 proceeds to a process in S215.

In step 215 (S215), in a case where a plurality of naming rules are present in the folder, the rule selecting section 226 prioritizes the naming rules, based on tag information or attribute information about the data file. That is, the rule selecting section 226 categorizes the data files registered in the same folder based on their similarity, and applies the same naming rule to the data files belonging to the same category. The categorization of the data files is performed based on similarity of attribute information, such as size, color, text, existence of a ruled line, etc., on a document.

In step 220 (S220), according to the naming rule selected by the rule selecting section 226, the file name creating section 228 arranges a character string for the tag information extracted from the data file and creates a file name candidate.

In step 225 (S225), the candidate presenting section 230 displays the file name candidate, created by the file name creating section 228, such that the file name candidate may be corrected. For example, the candidate presenting section 230 displays on the client terminal 80 or the like an input screen exemplified on the right-hand side of FIG. 9A and FIG. 9B. That is, in a case where there is only one naming rule, the candidate presenting section 230 displays a file name candidate as exemplified on the right-hand side of FIG. 9A, and waits for a correction to the file name candidate or a user's confirming operation (depression of an "OK" button). In a case where a plurality of naming rules are selected, the candidate presenting section 230 arranges and displays the plurality of file name candidates in priority order as exemplified on the right-hand side of FIG. 9B, and waits for a correction to each file name candidate or a user's confirming operation (depression of the "OK" button).

In step 230 (S230), according to the user's operation for the file name candidate presented by the candidate presenting section 230, the file name assigning section 234 assigns the file name to the data file and saves in the file storage section 270 the data file for which the file name has been assigned.

In step 235 (S235), based on the newly registered data file, the rule presuming section 222 re-presumes the naming rule of the folder where this data file has been saved.

Figure 9A:
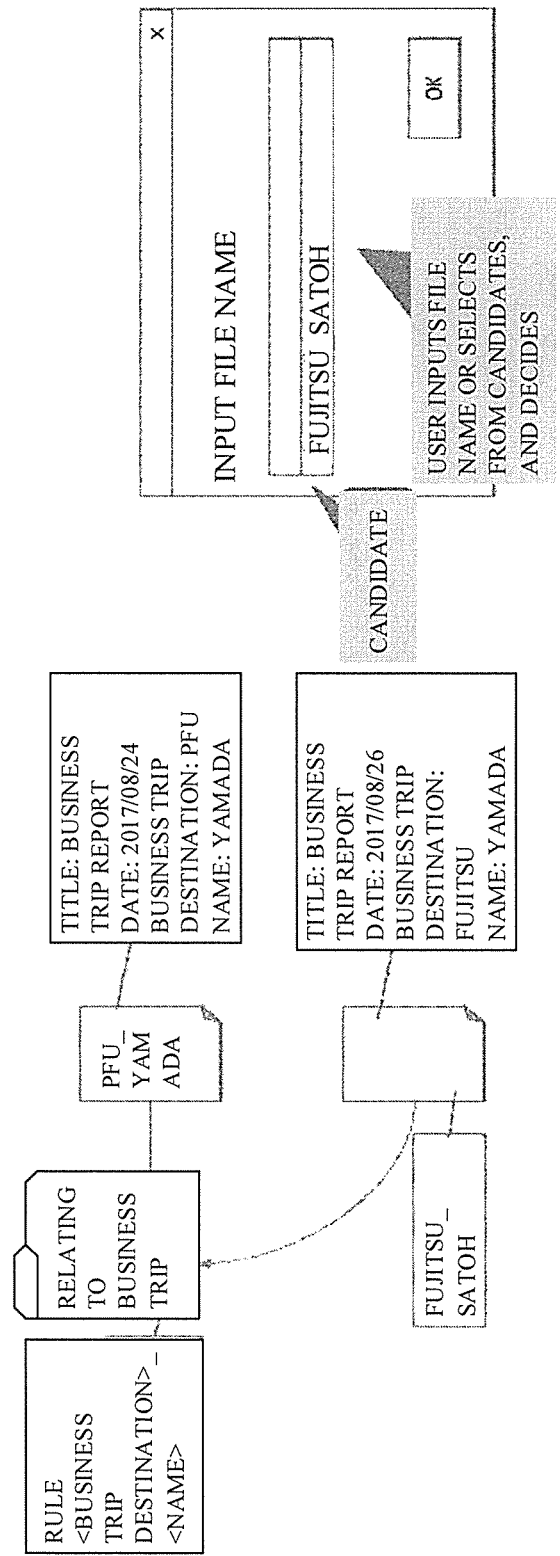
FIG. 9A and FIG. 9B are views exemplifying a process for assigning a file name according to a naming rule.
Figure 9B:
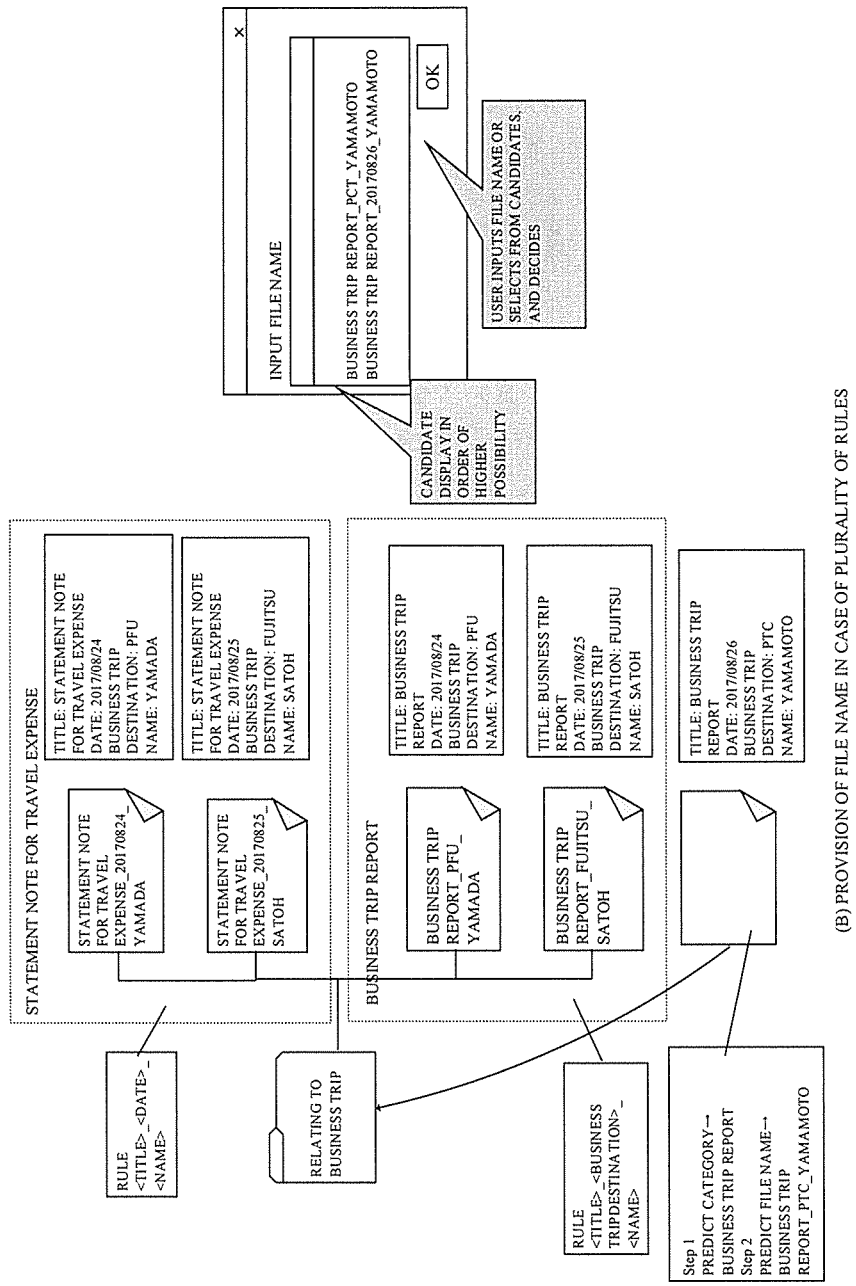

Thus, as exemplified in FIG. 9A and FIG. 9B, using the same naming rule as the naming rule of a data file present in the folder, the file name management program 22 automatically creates a file name for a data file to be newly saved. As exemplified in FIG. 9B, in a case where a plurality of naming rules are present in the same folder, the file name management program 22 prioritizes the naming rules, based on similarity of the data files, and displays the plurality of file name candidates according to the priority order.

Figure 7:
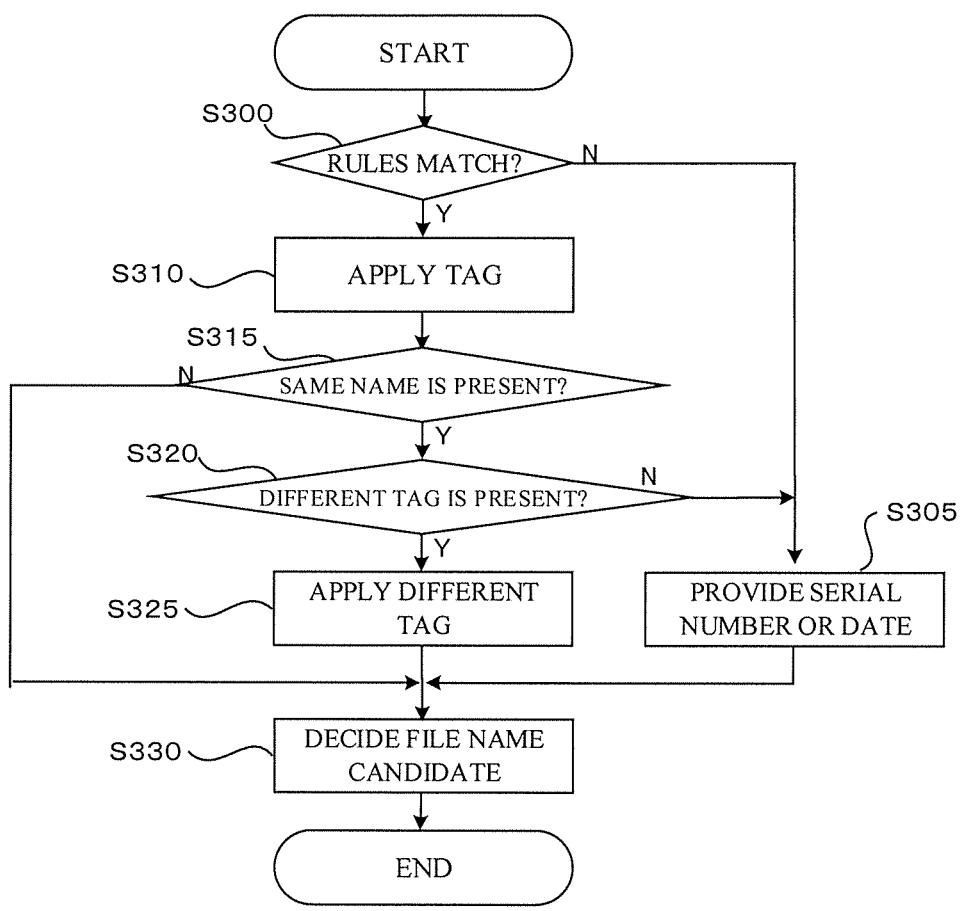
FIG. 7 is a flowchart illustrating a file name presumption process (S30) in greater detail.

FIG. 7 is a flowchart illustrating a file name presumption process (S30) in greater detail.

As exemplified in FIG. 7, in step 300 (S300), the file name creating section 228 determines, for a naming rule selected by the rule selecting section 226, whether a tag specified by the naming rule is contained in tag information extracted from a data file by the file analyzing section 220. In a case where the tag is contained, the file name creating section 228 proceeds to a process in S310. In a case where the tag specified by the naming rule is not contained, the file name creating section 228 proceeds to a process in S305.

In step 305 (S305), the file name creating section 228 uses a serial number or a date as a file name candidate.

In step 310 (S310), according to the naming rule selected by the rule selecting section 226, the file name creating section 228 arranges a character string for the tag information and a delimiter. In a case where part of a tag specified as a naming rule does not exist, a blank or "None" is suggested.

In step 315 (S315), the file name creating section 228 determines whether a created file name candidate matches the file name of an existing data file in the same folder. In a case where the candidate matches, the flow proceeds to a process in S320. In a case where the candidate matches none of existing files, the flow proceeds to a process in S330.

In step 320 (S320), the file name creating section 228 determines whether a tag whose name is different from the existing file name is present in the extracted tag information. In a case where a different tag exists, the flow proceeds to a process in S325. In a case where a different tag does not exist, the flow proceeds to a process in S305.

In step 325 (S325), using the different tag, the file name creating section 228 creates a file name candidate.

In step 330 (S330), the file name creating section 228 determines a file name candidate and displays the candidate on the candidate presenting section 230.

Figure 8:
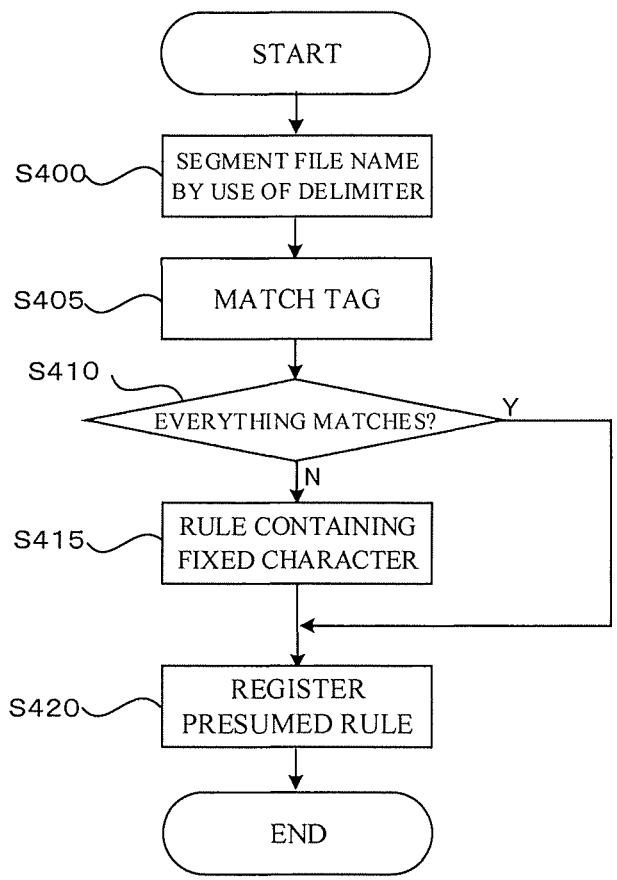
FIG. 8 is a flowchart illustrating a rule presumption process (S40) in greater detail.

FIG. 8 is a flowchart illustrating a rule presumption process (S40) in greater detail.

As exemplified in FIG. 8, in step 400 (S400), using a predetermined delimiter, the rule presuming section 222 segments the file name of a data file saved in a folder. Delimiters are, for example, an under-bar, a slash, an exclamation mark, etc. In FIG. 9A and FIG. 9B, a file name using an under-bar as delimiter is exemplified.

In step 405 (S405), the rule presuming section 222 matches tag information about a data file, and a character string segmented from the file name, and extracts a naming rule.

In step 410 (S410), in a case where a character string that does not match exists in the matching process in S405, the rule presuming section 222 proceeds to a process in S415. In a case where everything matches, the rule presuming section 222 proceeds to a process in S420.

In step 415 (S415), the rule presuming section 222 presumes that the portion of the character string that does not match is a naming rule that uses a fixed character string.

In step 420 (S420), the rule registering section 224 registers the naming rule, presumed by the rule presuming section 222, into the naming rule storage section 260 in association with the folder.

Figure 10:
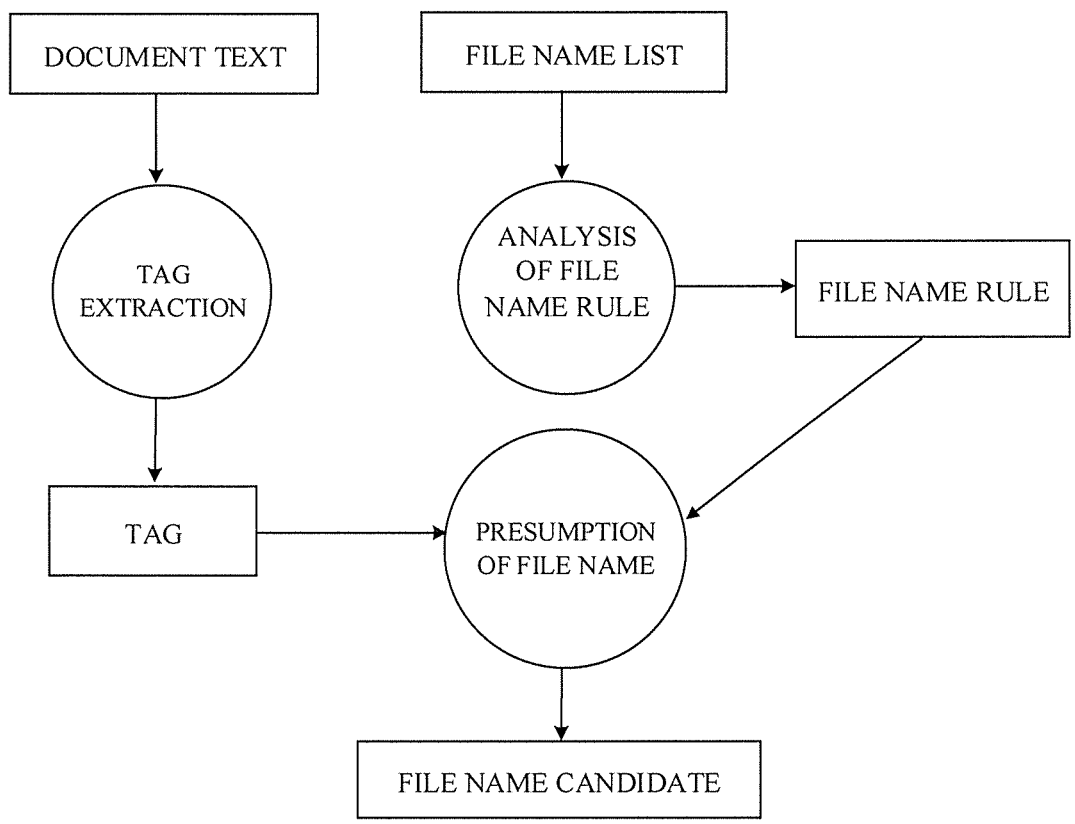
FIG. 10 is a view illustrating a data flow relating to a naming rule presumption and a file name assignment.

Thus, in the file name management program 22, as shown in FIG. 10, the respective naming rules of file names are presumed for each folder, based on a list of the names of the data files saved in the folder. In addition, in the file name management program 22, as shown in FIG. 10, a tag is extracted from the document text of a data file and a file name candidate is created based on the extracted tag information and the presumed naming rule.

In addition, in a case where the user performs a correction operation on the input screen displayed by the candidate presenting section 230, the correction detecting section 232 detects the user's correction operation, and instructs the rule presuming section 222 to presume a naming rule based on the corrected file name. Moreover, for other data files saved in the same folder as the data file whose file name has been corrected, the correction detecting section 232 instructs the file name creating section 228 and the file name assigning section 234 to re-assign a file name according to the naming rule presumed based on the corrected file name.

As described above, based on the file name of the data file saved in the folder, the file management system 1 in the present embodiment presumes the naming rule of the file name, and registers the presumed naming rule in association with this folder. Then, according to the naming rule associated with the folder, the file management system 1 automatically assigns a file name to a data file to be saved in this folder.

Modified Example

In the embodiment described above, a case where a data file is saved in a file server is used as a concrete example. However, the embodiment is not limited thereto. By installing the file name management program 22 in a client terminal, a file name may automatically be assigned to a data file saved in a folder of the client terminal.

In addition, if file names that are identical are assigned in the same folder, a serial number or a date may be added to the end of each file name.

In the embodiment described above, an example was used in which, in a case where a data file is moved between folders, a naming rule associated with the source folder of this file is moved to a destination folder and a file name is re-assigned. However, the embodiment is not limited thereto. The naming rule does not have to be moved but the movement of the data file may trigger re-assignment of a file name.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A file management device comprising:
a memory;
a processor coupled to the memory and the processor configured to:

presume, based on file names of data files present in a folder and tag information or attribute information extracted from the data files, a naming rule of the file names of data files in a same folder;

store the presumed naming rule of file names of data files in association with the folder;

select, from among the stored naming rules, the naming rules associated with the folder in which a data file is present and prioritize the selected naming rules based on tag information or attribute information extracted from the data file;

arrange a character string for the tag information or the attribute information extracted from the data file according to the selected naming rules to create a plurality of file name candidates;

arrange and display the plurality of file name candidates in prioritized order;

receive a user input; and assign a file name to the data file based on the user input.

2. The file management device according to claim 1, wherein the processor is further configured to:

detect a correction made to the file names of the data files by the user input; and presume, based on the corrected file names, the naming rule associated with the folder in which the data files are present.

3. The file management device according to claim 1, wherein in a case where the data file is moved to a predetermined folder, the processor is further configured to update the file name of the data file according to a naming rule associated with the predetermined folder.

4. The file management device according to claim 1, wherein in a case where the data file is moved to a predetermined folder, the processor further configured to store at least one of naming rules, associated with a source folder of the data file, in association with a destination folder of the data file.

5.

The file management device according to claim 1, wherein the processor is further configured to:

assign a file name to the data file, the file name being selected by the user input from among the file names presented.

6.

A file management method comprising:

presuming a naming rule of file names of data files in a same folder based on file names of data files present in a folder and tag information or attribute information extracted from the data files;

storing the presumed naming rule of file names of data files in association with the folder;

selecting, from among the stored naming rules, the naming rules associated with the folder in which a data file is present and prioritize the selected naming rules based on tag information or attribute information extracted from the data file;

arranging a character string for the tag information or the attribute information extracted from the data file according to the selected naming rules to create a plurality of file name candidates;

arranging and display the plurality of file name candidates in prioritized order;

receiving a user input; and assigning a file name to the data file based on the user input.

\* \* \* \* \*